(12) United States Patent
Nicolay et al.

(10) Patent No.: US 9,765,163 B2
(45) Date of Patent: Sep. 19, 2017

(54) PARTICLES CONTAINING REVERSIBLE COVALENT BONDS WHICH MAY BE SEQUENTIALLY FORMED AND BROKEN MULTIPLE TIMES

(71) Applicants: ECOLE SUPERIEURE DE PHYSIQUE ET DE CHIMIE INDUSTRIELLES DE LA VILLE DE PARIS, Paris (FR); UNIVERSITE PIERRE ET MARIE CURIE (PARIS 6), Paris (FR); CENTRE NATIONAL DE LA RECHERCHE SCIENTIFIQUE—CNRS, Paris (FR)

(72) Inventors: Renaud Nicolay, Montrouge (FR); Corinne Soulie-Ziakovic, Paris (FR); Ludwik Leibler, Paris (FR); Alexandre Prevoteau, Paris (FR); Nebewia Griffete, Livry-Gargan (FR)

(73) Assignees: ECOLE SUPERIEURE DE PHYSIQUE ET DE CHIMIE INDUSTRIELLES DE LA VILLE DE PARIS (ESPCI), Paris (FR); UNIVERSITE PIERRE ET MARIE CURIE (PARIS 6), Paris (FR); CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 0 days.

(21) Appl. No.: 14/437,595

(22) PCT Filed: Oct. 23, 2012

(86) PCT No.: PCT/IB2012/002307
§ 371 (c)(1),
(2) Date: Apr. 22, 2015

(87) PCT Pub. No.: WO2014/064482
PCT Pub. Date: May 1, 2014

(65) Prior Publication Data
US 2015/0240005 A1 Aug. 27, 2015

(51) Int. Cl.
| | | |
|---|---|---|
| *C08F 112/08* | (2006.01) | |
| *C09B 67/00* | (2006.01) | |
| *C08G 65/00* | (2006.01) | |
| *C08G 65/06* | (2006.01) | |
| *C08G 65/338* | (2006.01) | |
| *C08L 25/06* | (2006.01) | |
| *C08L 71/00* | (2006.01) | |
| *C08L 71/02* | (2006.01) | |
| *C09D 11/00* | (2014.01) | |
| *C09D 125/06* | (2006.01) | |
| *C09D 171/00* | (2006.01) | |
| *C09D 171/02* | (2006.01) | |
| *B82Y 30/00* | (2011.01) | |

(52) U.S. Cl.
CPC ............ *C08F 112/08* (2013.01); *C08G 65/00* (2013.01); *C08G 65/06* (2013.01); *C08G 65/338* (2013.01); *C08L 25/06* (2013.01); *C08L 71/00* (2013.01); *C08L 71/02* (2013.01); *C09B 68/20* (2013.01); *C09B 68/41* (2013.01); *C09B 68/444* (2013.01); *C09B 68/446* (2013.01); *C09D 11/00* (2013.01); *C09D 125/06* (2013.01); *C09D 171/00* (2013.01); *C09D 171/02* (2013.01); *B82Y 30/00* (2013.01)

(58) Field of Classification Search
None
See application file for complete search history.

(56) References Cited

U.S. PATENT DOCUMENTS

| 5,631,310 A | 5/1997 | Tooley et al. |
| 5,914,806 A | 6/1999 | Gordon, II et al. |
| (Continued) | | |

FOREIGN PATENT DOCUMENTS

| CN | 102123698 | 7/2011 |
| WO | 2010/019718 | 2/2010 |
| (Continued) | | |

OTHER PUBLICATIONS

Huntsman, Technical Bulletin (2002).*
International Search Report dated Sep. 3, 2013, which issued during prosecution of International Application No. PCT/IB2012/002307.
Mildred Quintana et al. "Multiple Hydrogen Bond Interactions in the Processing of Functionalized Multi-Walled Carbon Nanotubes" ACS NANO, American Chemical Society 6(1):Jan. 23-31, 2012.

*Primary Examiner* — Robert C Boyle
(74) *Attorney, Agent, or Firm* — Vedder Price P.C.; Thomas J. Kowalski; Deborah L. Lu

(57) ABSTRACT

The present invention is directed to a particle-containing entity P-(A--B-M)$_x$ wherein P is a solid particle attached to at least one polymer M through one or several reversible covalent bonds -A---B-, wherein A and B are functional groups respectively grafted to P and M thus forming the P-(A---B-M)$_x$ particle-containing entity with x being greater than or equal to 1, M has a degree of polymerization comprised between 5 and 1000, preferably ranging from 5 to 500, and wherein the reversible covalent bond -A---B- is chosen among an imine, a disulfide, a boronic ester or an acetal. The invention is also directed to a method of preparing this particle-containing entity, a method for sequentially forming and breaking the reversible covalent bond -A---B- in said particle-containing entity P-(A---B-M)$_x$ and dispersions comprising same.

4 Claims, No Drawings

(56) References Cited

U.S. PATENT DOCUMENTS

| | | | |
|---|---|---|---|
| 6,986,943 B1* | 1/2006 | Cook | B01J 2/30 427/214 |
| 2005/0124727 A1 | 6/2005 | Huber et al. | |
| 2006/0216259 A1 | 9/2006 | Haubennestel et al. | |
| 2009/0286928 A1 | 11/2009 | Takahashi et al. | |
| 2011/0300386 A1 | 12/2011 | Pardue, Jr. | |
| 2013/0040049 A1 | 2/2013 | Lellouche et al. | |

FOREIGN PATENT DOCUMENTS

| | | |
|---|---|---|
| WO | 2010/123600 | 10/2010 |
| WO | 2011/135560 | 11/2011 |

* cited by examiner

PARTICLES CONTAINING REVERSIBLE COVALENT BONDS WHICH MAY BE SEQUENTIALLY FORMED AND BROKEN MULTIPLE TIMES

RELATED APPLICATIONS AND INCORPORATED BY REFERENCE

The present application is filed pursuant to 35 U.S.C §371 as a U.S. National Phase Application of international application No. PCT/IB2012/002307, which was filed on Oct. 23, 2012. The entire content of each of the aforementioned applications is incorporated herein by reference in its entirety.

The present invention is directed to solid particles attached to polymers through one or several reversible covalent bonds, as well as dispersions containing these particles, methods of preparations of these dispersions, methods of disruptions of these dispersions and methods of recycling of said solid particles.

Small size particles, in particular microparticles or nanoparticles, are used in a very wide variety of technical fields, such as cosmetics, medicine, pharmacology, microelectromechanical systems (MEMS), printing, inks, inkjet inks, toners, semiconductors, sensors, catalysis, elastomers reinforcement, polymers reinforcements, coatings, plastic, rubbers, and the like. Other applications include ceramics, colorants, abrasion-resistant polymers, electrophotography, flavor enhancers, pesticides, or lubricants. They can indeed modify the chemical or mechanical properties of the medium in which they are introduced.

However, when dispersed in a medium, particles tend to aggregate because of interaction forces between each other, thereby destabilizing the dispersions. The medium of dispersion therefore has to be carefully adapted to the specific chemical properties of each particle in order to obtain stable dispersions and stability additives are often additionally required.

One approach to stabilize particles in dispersion is to adsorb or graft polymers to their surface. Repulsion occurs between the particles due to steric or electrostatic interactions induced by the polymer chains within the dispersing medium, thereby stabilizing the dispersion.

However, for steric or electrostatic interactions to occur, the polymer needs to be solubilized into the dispersing medium. Therefore, the particles grafted or adsorbed with the polymer can only be dispersed in some specific media that are able to solubilize the polymer. Thus, with this approach, once the particles are grafted with the polymer, it is not possible to disperse them in any kind of medium.

Moreover, once the particles are grafted or adsorbed with the polymer on their surface, they can no longer be recovered as bare particles and reused. Hence, the chemical modification of the particles is not reversible.

Therefore, there is a need for particles that can easily be dispersed in solvents or media of any chemical nature thus providing long-term stable dispersions, and that would be easily recovered to be re-dispersed in others media.

The present invention meets all those needs by providing new solid particles P attached to at least one polymer M through one or several reversible covalent bonds -A---B-, thereby becoming universally dispersible in any media, i.e. particles that can be dispersed in a stable way in any kind of solvents, reactive solvents, resins, matrices, as well as dispersions of these particles that are reversible and controllable, i.e. where particles may be further aggregated, recovered and then re-dispersed, if desired.

In one embodiment, the present invention is directed to a particle-containing entity $P\text{-}(A\text{---}B\text{-}M)_x$ wherein P is a solid particle attached to at least one polymer M through one or several reversible covalent bonds -A---B-,
- wherein A and B are functional groups respectively grafted to P and M thus forming the $P\text{-}(A\text{---}B\text{-}M)_x$ particle-containing entity with x being greater than or equal to 1,
- M has a degree of polymerization comprised between 5 and 1000, preferably ranging from 5 to 500,
- and wherein the reversible covalent bond -A---B- is chosen among a disulfide, a boronic ester or an acetal.

In another embodiment, the present invention is directed to a method for preparing said particle-containing entity $P\text{-}(A\text{---}B\text{-}M)_x$, said method comprising the following steps:
- attaching the functional group A to the surface of the solid particle P, thereby forming A-functionalized particles P or providing said A-functionalized particles P,
- attaching the functional group B to a polymer M, thereby forming B-functionalized polymers M or providing said B-functionalized polymers M, and wherein the functional group B is able to form a reversible covalent bond with the functional group A,
- reacting the A-functionalized particles P with at least one B-functionalized polymer M to form a reversible covalent bond between the functional groups A and B, thereby forming the $P\text{-}(A\text{---}B\text{-}M)_x$ particle-containing entity with x being greater than or equal to 1.

In another embodiment, the present invention is directed to a method for sequentially forming and breaking a reversible covalent bond -A---B- in a particle-containing entity $P\text{-}(A\text{---}B\text{-}M)_x$ wherein P is a solid particle attached to at least one polymer M through one or several reversible covalent bonds -A---B-,
- A and B are functional groups respectively grafted to P and M thus forming the $P\text{-}(A\text{---}B\text{-}M)_x$ particle-containing entity with x being greater than or equal to 1,
- M has a degree of polymerization comprised between 5 and 1000, preferably ranging from 5 to 500,
- and wherein the reversible covalent bond -A---B- is chosen among an imine, a disulfide, a boronic ester or an acetal, said method comprising the following steps:
  - attaching the functional group A to the surface of the solid particle P, thereby forming A-functionalized particles P or providing said A-functionalized particles P,
  - attaching the functional group B to a polymer M, thereby forming B-functionalized polymers M or providing said B-functionalized polymers M, and wherein the functional group B is able to form a reversible covalent bond with the functional group A,
  - reacting the A-functionalized particles P with at least one B-functionalized polymer M to form a reversible covalent bond between the functional groups A and B, thereby forming the $P\text{-}(A\text{---}B\text{-}M)x$,
  - breaking the covalent bonds -A---B- that link the A-functionalized particles and the B-functionalized particles.

In another embodiment, the present invention is directed to a dispersion of solid particles P in a medium, wherein each solid particle P is attached to at least one polymer M through one or several reversible covalent bonds -A---B-,
- wherein A and B are functional groups respectively grafted to P and M thus forming a particle-containing entity $P\text{-}(A\text{---}B\text{-}M)_x$ with x being greater than or equal to 1,
- M is a stabilizing agent capable of dispersing the particle P in said medium and has a degree of polymerization comprised between 5 and 1000, preferably ranging from 5 to 500, and wherein the reversible covalent bond -A---B- is chosen among an imine, a disulfide, a boronic ester or an acetal.

In another embodiment, the present invention is directed to a method for preparing the said dispersion of solid particles P in a medium, said method comprising the following steps:
- attaching the functional group A to the surface of the solid particle P, thereby forming A-functionalized particles P or providing said A-functionalized particles P,
- attaching the functional group B to a polymer M, thereby forming B-functionalized polymers M or providing said B-functionalized polymers M, and wherein the functional group B is able to form a reversible covalent bond with the functional group A,
- reacting, via a reversible reaction, the A-functionalized particles P with at least one B-functionalized polymer M to form a reversible covalent bond between the functional groups A and B, thereby forming the P-(A---B-M)$_x$ particle-containing entity with x being greater than or equal to 1,
- dispersing the P-(A---B-M)$_x$ particle-containing entity in the medium.

In another embodiment, the present invention is directed to a method for sequentially dispersing and aggregating A-functionalized particles P in a medium, said method comprising the following steps:
- preparing a dispersion of A-functionalized solid particles P in said medium according to the method described above, thereby forming the P-(A---B-M)$_x$ particle-containing entity dispersed in said medium wherein the B-functionalized polymers M are reversibly attached to the A-functionalized particles P through one or several reversible covalent bonds,
- aggregating the A-functionalized particles P by either reducing the solubility of the polymers M in the medium and/or by breaking the reversible covalent bond(s) -A---B-.

The particle-containing entity P-(A---B-M)$_x$ of the present invention can be used to prepare stable dispersions of A-functionalized solid particles P in any kind of media by choosing the appropriate B-functionalized polymer M which is able to solubilize in said medium and induce steric or electrostatic repulsion between the entity P-(A---B-M)$_x$, thereby stabilizing the dispersion.

Thanks to the specific properties of the reversible covalent bonds -A---B-, the A-functionalized solid particles P can be recovered from the dispersions by either:
- first aggregating the P-(A---B-M)$_x$ particle-containing entity, and then breaking the reversible covalent bond -A---B-, or
- first breaking the reversible covalent bond -A---B-, and then recovering the A-functionalized particles P.

In the context of the present invention, the reversible covalent bond -A---B- is formed between a functional group A and a functional group B that are respectively grafted to the particle P and the polymer M.

As a result, any kind of B-functionalized polymers M may be attached to any kind of A-functionalized particles P, provided that the functional group A and the functional group B can form a reversible covalent bond.

Within the meaning of the invention, a reversible covalent bond is a covalent bond that can be broken and reformed multiple times, for example at least two or three times, under specific conditions.

The reversibility of the covalent bond can either be induced by the application of an external stimulus or by the addition of a competitive molecule C capable of interfering with the covalent bonding -A---B-.

For example, thet reversibility of the covalent bonds can be induced by different stimuli, such as pH, reducing/oxidizing agents, removal/addition of a competitor C. Preferably, reversibility is accessible under mild conditions (T<40° C., 3<pH<10).

The Solid Particles P

It is understood that the present invention is not limited to a specific solid particle, but encompasses any kind of particles, including mineral, organic, or mixed particles.

Mineral particles may include, but are not limited to, metal particles. Metal particles encompass particles formed exclusively with metals chosen among alkaline earth metal, transitional metal, rare earth metal, and alloys thereof. In some embodiments, the metal may be aluminium, copper, cadmium, selenium, silver, gold, indium, iron, platine, nickel, molybdene, silicium, titane, tungstene, antimony, palladium, zinc, tin, and alloys thereof. These metal particles may be metal organomodified nanoparticles having chemical entities grafted to their surface or having a self-assembled monolayer of compounds, such as organosulfur compounds, on their surface.

In some embodiments, particles may be particles of metal oxides, such as titane, zinc, cerium, zirconium or aluminium oxide, of bismuth oxychloride, carbides, nitrides, borides, sulfides or hydroxides, inorganic salts, for instance, baryum sulfate, calcium carbonate, calcium sulfate, calcium phosphate, magnesium hydrocarbonate, metal soaps derived from organic carboxylic acids having from 8 to 22 carbon atoms, preferably from 12 to 18 carbon atoms, for instance zinc stearate, magnesium or lithium stearate, zinc laurate, magnesium myristate, clays, silicates, alumina, silica, kaolin, or hydroxyapatite.

The particles may also be organic particles, typically formed from an organic polymer.

Organic polymers encompass, but are not limited to, polystyrene, poly(vinyl acetate), poly(-methylstyrène), poly (acrylamide), poly(acrylonitrile), poly(vinyl chloride), copolymers of styrene and C1-C4alkyl (meth)acrylate, copolymers of styrene and acrylamide, copolymeres of styrene and acrylonitrile, copolymeres of styrene and vinyl acetate, copolymeres of acrylamide and C1-C4 alkyl (meth)acrylates, copolymeres from acrylonitrile and C1-C4 alkyl (meth)acrylate, copolymeres of acrylonitrile and acrylamide, terpolymeres from styrene, acrylonitrile and acrylamide, poly(methyl methacrylate), poly(ethyl methacrylate), copolymeres styrene/butadiene, styrene/acrylic acid, styrene/vinylpyrrolidone and butadiene/acrylonitrile.

For instance, organic nanoparticles include, but are not limited to, nylon (ex: "ORGASOL 2002 ED NAT COS" marketed by ATOCHEM), polethylene powders (ex: "COATHYLENE HA 1681" marketed by PLAST LABOR), poly-2-alanine powders, polyfluorinated powders such as polytetrafluoroethylene (ex: "MP 1400" marketed by DUPONT DE NEMOURS), acrylic copolymer powders (ex: "POLYTRAP Q5 6603" marketed by DOW CHEMICA), polystyrene powders (ex: "POLYSPHERE 3 000 SP" marketed by PRESPERESE), polyester powders, expanded microspheres in thermoplastic material (ex: "EXPANCEL 551 DE" marketed by EXPANCEL), microballs of silicon resins (ex: (Tospearls marketed by TOSHIBA), synthetic hydrophil polymer powderssuch as polacrylates (ex: "MICROPEARL M 100" marketed by MATSUMOTO), acrylic polyamides (ex: those marketed by ORIS), insoluble polyurethanes (ex: "PLASTIC POWDER D 800" marketed by TOSHNU), porous microspheres of cellulose, micro- or nanoparticles of PTFE (polytetrafluoroethylene).

In some embodiments, particles may be pigments. These pigments can be, but are not limited to, pigments used in ink compositions (including inkjet ink compositions), coating compositions (including paint formulations), liquid and solid toners, films, plastics, rubbers, and the like. Examples include, but are not limited to, black pigments (e.g., carbon products like carbon black) and other colored pigments (e.g., polymeric and organic pigments, or inorganic pigments). The colored pigment can be blue, black, white, brown, cyan, green, violet, magenta, red, yellow, as well as mixtures thereof. Organic colored pigments include, for example, phthalocyanine blues (copper phthalocyanine blue and derivatives thereof such as Pigment Blue 15), phthalocyanine greens, anthraquinones (Pigment Red 43, Pigment Red 194 (Perinone Red), Pigment Red 216 (Brominated Pyanthrone Red) and Pigment Red226 (Pyranthrone Red)), diazos, monoazos, pyranthrones, perylenes (Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224), heterocyclic yellows (Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow, Pigment Yellow 117, Pigment Yellow 128 and Pigment Yellow 138), quinacridones (Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42), and (thio)indigoids (Pigment Red 86, Pigment Red 87, Pigment Red 88, Pigment Red 181, Pigment Red 198, Pigment Violet 36, and Pigment Violet 38). Such pigments are commercially available in either powder or press cake form from a number of sources including, BASF Corporation, Engelhard Corporation and Sun Chemical Corporation. Examples of other suitable colored pigments are described in the *Colour Chemistry*, H. Zollinger, 3rd edition, Wiley-VCH, Weinheim, 2003. ISBN: 3-906390-23-3.

Suitable classes of inorganic colored pigments include, for example, titanium dioxide, zinc sulphides, zinc sulfoselenides, zinc oxide, iron oxides (goethite, lepidocrocite, hematite, maghemite, magnetite), chromium oxide green, chrome yellow, cadmium pigments (sulfides and sulfoselenides), antimony trioxide, calcium chromate, cerulean blue (cobalt stannate). Such pigments are commercially available in either powder or press cake form from a number of sources including, Cabot, Degussa, Ciba-Geigi, Union Colours, and Merck. Examples of other suitable inorganic colored pigments are described in the *Industrial Inorganic Pigments*, G. Bunxbaum, VCH, Weinheim, 1993. ISBN: 3-527-28624-1.

Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks avail-5 able from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, 10 Monarch® 1100, Monarch® 1000, Monarch® 900, Monarch® 880, Monarch® 800, Monarch® 700, Mogul® L, Regal® 330, Regal® 400, Vulcan® P). Other suitable carbon blacks include, but are not limited to, Printex 40, Printex 80, Printex 300, Printex L, Printex U, Printex V, Special 15 Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Columbian Chemical Corporation) and MAI 00 and MA440 available from Mitsubishi Chemical Corporation. The carbon may be of the crystalline or amorphous type. Examples include, but are not limited to, graphite, carbon black, vitreous carbon, carbon fibers, activated charcoal, activated carbon.

In a particular embodiment, the particles can be conductive particles, such as carbon nanotubes (CNTs) for example.

In a particular embodiment, the particles can be magnetic particles, such as ferrites or magnetites for example.

In a particular embodiment, the particles may be used as catalysts.

In a preferred embodiment, the solid particles can be chosen among metal, metal oxide, silica, cellulose particles, carbon nanotubes (CNTs), graphene sheets, or pigments, such as $TiO_2$, $Cr_2O_3$, $Fe_2O_3$, $Fe_3O_4$ anthraquinones, phthalocyanines, perylene, quinacridone, indigoid, condutive or magnetic particles, or particles that may be used as catalysts The solid particles of the invention may be of any size, and can in particular be microparticles or nanoparticles.

The particles used in the context of the present invention can for example have a particulate size ranging from 0.005 and 1000 µm, more preferably from 0.01 and 100 µm, and even more preferably from 0.01 and 10 µm.

In one embodiment, the particles are not intended for any types of drug delivery systems. In particular, the particles P according to the invention are not proteins or liposomes and the polymers M are not biopolymers.

In a preferred embodiment, the solid particles are grafted with functional groups A capable of forming reversible covalent bonds attached to their surface (herein denoted "A-functionalized particles P").

A large number of functionalized particles are commercially available, such as CAB-O-SIL® TG-C Series (Cabot Corporation), SpectrAl® (Cabot Corporation), Nanopartz™ Accurate™ Spherical Gold Nanoparticles (Nanopartz Inc.), Nanopartz™ Gold Nanorods (Nanopartz Inc.), Conjugated Nanopartz™ Gold Nanoparticles (Nanopartz Inc.), Conjugated Nanopartz™ Gold Nanoparticles (Nanopartz Inc.), 140306-10 (Corpuscular Inc) 140320-10 (Corpuscular Inc), 140350-10 (Corpuscular Inc), 140390-10 (Corpuscular Inc), 140444-10 (Corpuscular Inc), 140460-10 (Corpuscular Inc), 140480-10 (Corpuscular Inc), 130320-10 (Corpuscular Inc), 130370-10 (Corpuscular Inc), 130390-10 (Corpuscular Inc), 130426-10 (Corpuscular Inc), 130444-10 (Corpuscular Inc), 130460-10 (Corpuscular Inc), 130480-10 (Corpuscular Inc), 220320-10 (Corpuscular Inc), 220350-10 (Corpuscular Inc), 220374-10 (Corpuscular Inc), 220390-10 (Corpuscular Inc), 220412-10 (Corpuscular Inc), (Corpuscular Inc), 220418-10 (Corpuscular Inc), 181109-05 (Corpuscular Inc), (Corpuscular Inc), 181113-05 (Corpuscular Inc), 181117-05 (Corpuscular Inc), AJ11017 (Aldlab Nanotech), AJ11020 (Aldlab Nanotech), AJ11155 (Aldlab Nanotech), AJ11156 (Aldlab Nanotech), AJ11090 (Aldlab Nanotech), AJ11092 (Aldlab Nanotech), AJ11094 (Aldlab Nanotech).

The method of the invention is particularly easy to carry out since it only requires that polymers M be provided with functional group(s) B able to form a reversible covalent bond with A.

In the context of the present invention, the A-functionalized particles P are attached to at least one B-functionalized polymer M through one or several reversible covalent bonds -A---B-, preferably M being capable of dispersing the particle P in the desired medium.

In a specific embodiment, the solid particles P can be grafted with several functional groups A of different chemical natures; wherein functional groups A are capable of forming reversible covalent bonds with B-functionalized polymers M. In this embodiment, it is therefore possible to selectively break only some of the reversible covalent bonds -A---B-.

In another specific embodiment, the A-functionalized particles P can be attached to several polymers M of different chemical natures; preferably M being capable of dispersing the particle P in the desired medium. In this embodiment, it is therefore possible to affect the dispersability of the particles with multiple stimuli or to allow dispersability of the particles P in different media in which each grafted polymer may be solubilized.

In another specific embodiment, the A-functionalized particles P are attached to at least one B-functionalized polymer M through several reversible covalent bonds -A---B- of different chemical nature. In this embodiment, it is therefore possible to selectively break only some of the reversible covalent bonds -A---B-.

In a preferred embodiment, the A-functionalized particles P should have enough B-functionalized polymers M attached to their surface to allow a good dispersability of the particles within the medium. The number of polymers M necessary to ensure good dispersability of the particles will fully depends on the nature of the particles P, the polymers M and the medium and can be adjusted by the skilled person.

In this preferred embodiment, the A-functionalized particles P should have enough functional groups A forming reversible covalent bonds -A---B- with the B-functionalized polymers M, and preferably should have at least the same number of functional groups A as of B-functionalized polymers M necessary to ensure good dispersability of the particles.

Indeed, without willing to be bound by any theory, it has been observed that when polymers M are attached to the surface of particles P, the polymers attached around the particle surface isolate the particles from one another, thus creating repulsion between the particles. The repulsion may be steric or electrostatic, as long as it prevents the particles from aggregating with each other in the medium. The more polymers M are attached to each particle P, the more repulsion will be induced between the particles, thereby stabilizing the dispersion.

The A-functionalized particles P may be prepared according to techniques well-known by the person skilled in the art for example as disclosed in Aryl Diazonium Salts, Mohamed Mehdi Chehimi (Editor), Publisher: Wiley-VCH; ISBN-10: 3527329986, ISBN-13: 978-3527329984.

The Polymers M

The A-functionalized solid particles P of the invention are reversibly attached to at least one polymer M through one or several reversible covalent bonds -A---B-.

The B-functionalized polymers M used in the present invention have a degree of polymerization comprised between 5 and 1000, preferably ranging from 5 to 500.

In a preferred embodiment, M is a stabilizing agent capable of dispersing the particle P in a medium, that is to say that it prevents the formation of particles aggregates and it improves the stability of the dispersion of the particles in the medium.

The dispersions of the invention for example do not comprise aggregates bigger than 20 μm, in particular bigger than 10 μm, as observed by optical microscopy.

As for the solid particles, it should be understood that the present invention is not limited to a specific type of polymers M in term of composition, topology and functionality.

The polymer M can for example be organic, inorganic, hydrophilic, hydrophobic, neutral or ionic. Polymer M may be linear, branched, hyperbranched, grafted, comb-like, star-like, cyclic or a combination of these topologies. Polymer M may also be a homopolymer, a block copolymer, a random copolymer, a gradient copolymer, an alternating copolymer or a multiblock copolymer.

Polymers M may be polar, apolar, hydrophilic, hydrophobic, neutral, positively and/or negatively charged.

All polymers which are already used in the state of the art for that purpose can be used in the present invention (Practical Dispersion: A Guide to Understanding and Formulating Slurries; R. F. Conley; Editeur: John Wiley & Sons Inc (Mar. 27, 1996); ISBN-10: 0471186406; ISBN-13: 978-047118640; Colloidal Polymers: Synthesis and Characterization; Editeur: Marcel Dekker Inc (Aug. 6, 2003), ISBN-10: 0824743040, ISBN-13: 978-0824743048) The polymers might include n types of repeating units, with n ranging from 1 to 20, and preferably ranging from 1 to 6. The polymers might be obtained by radical polymerization, controlled radical polymerization, coordination polymerization, metathesis polymerization, ring opening polymerization, anionic polymerization, cationic polymerization, polycondensation or polyaddition.

Polymers M include, but are not limited to, polyolefins, polyolefin copolymers, poly(vinyl chloride), polystyrene and styrenics polymers polydienes, polylactones, polylactames, polycarbonates, polyamides, polyamines, polyelectrolites, polyesters, polyethers, polyimides, polyimines, polymers containing sulfur, methacrylates polymers, acrylate polymers, acrylonitrile, polyethylene glycol, chlorinated polymers such as poly(vinyl chloride), fluorinated polymers and other halogenated polymers, ionomeric polymers, poly(vinyl ketone), polymers containing ketone groups, liquid crystal polymers, polymers containing olefinic double bond(s), poly(phenylene oxide), poly(vinyl alcohol), polyurethanes, polyureas, acetal polymers, poly(vinyl ester)s, thermoplastic elastomers, and the like.

Polymers M also include copolymers of the previously cited polymers.

Polymers also include stimuli responsive polymers. Stimuli responsive polymers are well known by the person skilled in the art for example from the disclosures (Emerging applications of stimuli-responsive polymer materials; M. A. Cohen Stuart et al.; Nature Materials, 9 (2010), 101-113; or Recent advances and challenges in designing stimuli-responsive polymers; F. Liu, M. W. Urban; Progress in Polymer Science, 35 (2010) 3-23) This class of polymers encompasses polymers of which properties are sensitive to physicochemical parameters, such as light, pH, temperature, polarity, ionic strength, electrical or magnetic field for example.

According to the invention, polymers M are chosen depending on the medium in which particles are intended to be dispersed. Said polymers M should preferably be soluble in said medium. Indeed, without willing to be bound by any theory, it has been observed that when polymers M are attached to the surface of the particles P, part of the polymer is bounded to the surface of the particle, while the rest of the molecule extend away from the particle surface into the medium, thereby inducing repulsion between the particles. The repulsion may be steric or electrostatic, as long as it prevents the particles from aggregating with each other in the medium. The more the polymers M are soluble in the medium, the more they induce repulsion between particles, thereby stabilizing the dispersion. When the medium in which particles are dispersed is a polymer melt, said polymers M and melt chains from the polymer melt should preferably present a negative Flory interaction parameter $\chi$.

The polymers M can also be provided with functional groups B able to form a reversible covalent bond (herein denoted "B-functionalized polymers M"). For instance, a large number of B-functionalized polymers are commercially available, such as JEFFAMINE® (Huntsman), SP-6P-6-001 (Specific Polymers), SP-6P-6-002 (Specific Polymers), SP-1P-4-003 (Specific Polymers), SP-1P-6-001 (Specific Polymers), SP-4P-4-003 (Specific Polymers), CN UVA 421 (Sartomer), CN 501 (Sartomer), CN 503 (Sartomer), CN 525 (Sartomer), CN 550 (Sartomer), CN 554 (Sartomer), P6135-MMANH2 (Polymer Source™), P3820-MMANH2 (Polymer Source™), P5115-MMANH2 (Polymer Source™), P3523-MMANH2 (Polymer Source™), P3542-MMANH2 (Polymer Source™), P5836A-AANH2 (Polymer Source™), P5839A-AANH2 (Polymer Source™), P9984-AANH2 (Polymer Source™), P9754-AAOH (Polymer Source™), P9981A-PrAANH2 (Polymer Source™), P9984A-nBuANH2 (Polymer Source™), P5836-tBuANH2 (Polymer Source™), P5839-tBuANH2 (Polymer Source™), P9840-tBuANH2 (Polymer Source™), P3544-tBuMANH2 (Polymer Source™), P3541-tBuMANH2 (Polymer Source™), P6007-tBuMANH2 (Polymer Source™), P10118-tBuA-acetal (Polymer Source™), P10109-MMA-acetal (Polymer Source™), P10109B-MMA-acetal (Polymer Source™), P10109A-MMA-acetal (Polymer Source™), P2605-EtAOH (Polymer Source™), P1729-EtAOH (Polymer Source™), P2606-EtAOH (Polymer Source™), P9324-EtMAOH (Polymer Source™), P2590-MMAOH (Polymer Source™), P10423-MMAOH (Polymer Source™), P6609-MMAOH (Polymer Source™), P6610D-MMAOH (Polymer Source™), P9321-MMAOH (Polymer Source™), P10466-MMAOH (Polymer Source™), P10465-MMAOH (Polymer Source™), P2590-MMAOH (Polymer Source™), P10423-MMAOH (Polymer Source™), P6609-MMAOH (Polymer Source™), P9321-MMAOH (Polymer Source™), P10466-MMAOH (Polymer Source™), P1755-nBuAOH (Polymer Source™), P1733-nBuAOH (Polymer Source™), P9754A-tBuAOH (Polymer Source™), P9322-tBuAOH (Polymer Source™), P9323-nBuMAOH (Polymer Source™), P6828-BzPrAOH (Polymer Source™), P9565-AzoMAOH (Polymer Source™), P3647-NPMAOH (Polymer Source™), P5741-MMASH (Polymer Source™), P5740-MMASH (Polymer Source™), P5738-MMASH (Polymer Source™), P7103C-NIPAMNH2 (Polymer Source™), P10405A-NIPAMNH2 (Polymer Source™), P6145J-NIPAMNH2 (Polymer Source™), (Polymer Source™), P10430A-NIPAMNH2 (Polymer Source™), P6145A-NIPAMNH2 (Polymer Source™), P5534-NIPAMOH (Polymer Source™), P6690-NIPAMSH (Polymer Source™), P5754-NIPAMSH (Polymer Source™), P3977-BdNH2 (Polymer Source™), P3975-BdNH2 (Polymer Source™), P3979-BdNH2 (Polymer Source™), P3952-BdNH2 (Polymer Source™), P6056-BdNH2 (Polymer Source™), P6057-BdNH2 (Polymer Source™), P10047-BdOH (Polymer Source™), (Polymer Source™), P2894-BdOH (Polymer Source™), P9054-BdOH (Polymer Source™), P8266-BdOH (Polymer Source™), P8944-BdOH (Polymer Source™), P4148-BdOH (Polymer Source™), P8657-BdOH (Polymer Source™), P4971-BdOH (Polymer Source™), P4963-BdOH (Polymer Source™), P2094-BdOH (Polymer Source™), P9761-BdOH (Polymer Source™), P4127-IPOH (Polymer Source™).

The present invention is particularly easy to carry out since it only requires that particles P be provided with functional group(s) A able to form a reversible covalent bond with B.

The B-functionalized polymers M may be prepared according to techniques well-known by the person skilled in the art (Macromolecular Engineering: Precise Synthesis, Materials Properties, Applications; K. Matyjaszewski, Y. Gnanou, L. Leibler; Editeur: Wiley-VCH Verlag GmbH (Feb. 23, 2007), ISBN-10: 3527314466; ISBN-13: 978-3527314461; Nanostructured functional materials prepared by atom transfer radical polymerization; K. Matyjaszewski and N. V. Tsarevsky; Nature materials (2009) 1 276-288; Handbook of RAFT Polymerization, C. Barner-Kowollik (Editor); ISBN-10: 3527319247 | ISBN-13: 978-3527319244).

The B-functionalized polymer M may bear one or several functional groups B able to form a reversible covalent bond with the A-functionalized particle P. The number of functional groups B can thus be greater than or equal to 1, and can for example be ranging from 1 and 10.

The dispersion or aggregation of the A-functionalized particles P within the dispersing medium may be controlled by adjusting the number and/or position of the reversible covalent bonds -A---B-. For instance, when the B-functionalized polymer M contains several functional groups B able to form a reversible covalent bond with A-functionalized particles P, the B-functionalized polymer M will be able to form more than one bond with the A-functionalized particle P, and can therefore be linked to several A-functionalized particles P. This favors the aggregation of the particles in the medium as explained in the publication entitled Multiple Hydrogen Bond Interactions in the Processing of Functionalized Multi-Walled Carbon Nanotubes, M. Quintana, ACSNano, 6(1), 23-31 (2012)).

Therefore, in a preferred embodiment, a B-functionalized polymer M can only be attached to one A-functionalized particle P at a time.

The aggregation of the A-functionalized particles will also depend on the position of the functional groups B along the B-functionalized polymers M. The more the functional groups B are distributed and spaced apart within the polymer M, the more aggregation of A-functionalized particles P will be favored.

In a preferred embodiment, the functional group(s) B are positioned at the end of the polymeric chain of polymer M.

In another embodiment, the functional group(s) B are positioned in a block located at the end of the chain-of the polymer M. In this embodiment, the block containing the functional group(s) B has a degree of polymerization comprised between 1 and 20 and preferably comprises 1 to 10 functional group(s) B.

Reversible Covalent Bond/Reversible Dispersions

According to the invention, the B-functionalized polymers M are reversibly attached to the A-functionalized particles P through one or several reversible covalent bonds -A---B-.

As already explained, the term "reversible covalent bond" means in the context of the present invention, a covalent bond that can be broken and reformed multiple times, for example at least two or three times, under specific conditions.

One advantage of the invention is that the A-functionalized particles P can be recovered for a further re-use.

Indeed, the particle-containing entity P-(A---B-M)$_x$ dispersed in the medium may be then aggregated by breaking the reversible covalent bond -A---B- by any techniques well know by the person skilled in the art (T. W. Greene, P. G. M. Wuts, Protective Groups in Organic Synthesis, Third edition, 1999, ISBN 0-471-160-19-9; P. T. Corbett et al. Dynamic Combinatorial Chemistry, Chem. Rev. 2006, 106, 3652-3711; Boronic Acids: Preparation And Applications In Organic Synthesis And Medicine; D. G. Hall, Editeur: Wiley-VCH Verlag GmbH (Nov. 18, 2005), ISBN-10: 3527309918, ISBN-13: 978-3527309917; The Chemistry of sulphur-containing functional groups; S. Patai, Z. Rappoport; John Wiley & Sons Ltd (Sep. 30, 1993), ISBN-10: 0471930466; ISBN-13: 978-0471930464). For instance, the breaking of the reversible covalent bond can be done by increasing or decreasing the pH of the medium, by adding a reducing agent to the medium, or by adding a competitor molecule C capable of reacting with either A or B functional groups or with the A---B reversible covalent bond, thereby breaking the reversible covalent bond A---B.

After aggregation, the A-functionalized particles P may be recovered by physical separation, such as filtration or centrifugation.

After recovery, the A-functionalized particles P may be then re-dispersed in the same or in a different medium after having attached new appropriate B-functionalized polymers M.

In the context of the present invention, the reversible covalent bond can be chosen among an imine, a disulfide, a boronic ester or an acetal functions.

Imine Bond

An imine bond may be formed by reacting an aldehyde, a ketone or an imine with a primary amine, a hydroxylamine or an imine in any kind of solvents or media that does not contain reactive groups capable of forming imine bonds. (see for example T. W. Greene, P. G. M. Wuts, Protective Groups in Organic Synthesis, Third edition, 1999, ISBN 0-471-160-19-9; Dynamic imine chemistry; M. E. Belowicha and J. F. Stoddart, Chem. Soc. Rev., 2012, 41, 2003-2024). The imine bond may be formed at temperatures comprised between 0 and 100° C., and preferably between 10 and 40° C.

Therefore, in a preferred embodiment of the invention, one of functional groups A and B comprises an amine function, a hydroxylamine function or an imine function, and the other comprises an aldehyde function, a ketone function or an imine function so that the resulting -A---B- reversible covalent bond is an imine. Molar ratios between A functional groups and B functional groups ([A]/[B]) may be comprised between 0.01 and 10, and preferably between 0.1 and 1.

The imine bond may be broken by acid hydrolysis at temperatures comprised between 0 and 100° C., and preferably between 10 and 40° C.

Inorganic acids as well as organic acids may be used for imine bond acid hydrolysis. Inorganic acids that can be used include, but are not limited to, HCl, H2SO4. Organic acids that can be used include, but are not limited to, p-toluenesulfonic acid, carboxylic acids. (T. W. Greene, P. G. M. Wuts, Protective Groups in Organic Synthesis, Third edition, 1999, ISBN 0-471-160-19-9). The acid may be used in catalytic amount, with a molar ratio, as compared to B-functionalized polymers M, comprised between 0.001 and 1, and preferably between 0.01 and 0.1. Water can be used with a molar ratio, as compared to B-functionalized polymers M, comprised between 1 and 20, and preferably between 1 and 10.

The imine bond may be broken by reaction with a competitor molecule C at temperatures comprised between 0 and 100° C., and preferably between 10 and 40° C. Competitor molecules may be small organic molecules or polymers carrying at least one of the following functional groups: primary amine, hydroxylamine, aldehyde, ketone or imine (Dynamic imine chemistry; M. E. Belowicha and J. F. Stoddart, Chem. Soc. Rev., 2012, 41, 2003-2024; P. T. Corbett et al. Dynamic Combinatorial Chemistry, Chem. Rev. 2006, 106, 3652-3711). The competitor C can be used with a molar ratio, as compared to B-functionalized polymers M ([C]/[B]), comprised between 1 and 20, and preferably between 1 and 10.

In some embodiments, it may be desirable to block the reversibility of the covalent bonding. The reversible nature of the imine reversible covalent bond may be completely and definitely suppressed by reducing the imine function to an amine function using for example sodium borohydride or sodium cyanoborohydride (Reductive Aminations of Carbonyl Compounds with Borohydride and Borane Reducing Agents—E. W. Baxter and A. B. Reitz—Organic Reactions Volume 59 (2002)—Org. React. Vol. 59, 2002—ISBN 9780471176558).

Disulfide Bond

A disulfide bond may be formed by reacting two thiols, a thiol with a disulfide or two disulfides in any kind of solvent or medium that does not contain reactive groups capable of forming disulfide bonds (The Chemistry of sulphur-containing functional groups; S. Patai, Z. Rappoport; John Wiley & Sons Ltd (30 septembre 1993), ISBN-10: 0471930466; ISBN-13: 978-0471930464; P. T. Corbett et al. Dynamic Combinatorial Chemistry, Chem. Rev. 2006, 106, 3652-3711). The disulfide bond may be formed at temperatures comprised between 0 and 100° C., and preferably between 10 and 40° C.

Therefore, in a preferred embodiment of the invention, one of functional groups A and B comprises a thiol function or a disulfide function, and the other comprises a thiol or disulfide function so that the resulting -A---B- reversible covalent bond is a disulfide. Molar ratios between A functional groups and B functional groups ([A]/[B]) can be comprised between 0.01 and 10, and preferably between 0.1 and 1.

The disulfide covalent bond may be broken by reaction with a reducing agent at temperatures comprised between 0 and 100° C., and preferably between 10 and 40° C. Reducing agents that can be used include, but are not limited to, thiols such as dithiothreitol, phosphines, such as triphenylphosphine, tributylphosphine or tris(2-carboxyethyl)phosphine, with water, zinc, sodium borohydride. The reducing agent and/or water can be used with a molar ratio, as compared to B-functionalized polymers M, comprised between 1 and 20, and preferably between 1 and 10.

The disulfide bond may also be broken by reaction with a competitor molecule C at temperatures comprised between 0 and 100° C., and preferably between 10 and 40° C. Competitor molecules may be small organic molecules or polymers carrying at least a thiol or a disulfide function (The Chemistry of sulphur-containing functional groups; S. Patai, Z. Rappoport; John Wiley & Sons Ltd (Sep. 30, 1993), ISBN-10: 0471930466; ISBN-13: 978-0471930464; P. T. Corbett et al. Dynamic Combinatorial Chemistry, Chem. Rev. 2006, 106, 3652-3711). The competitor C may be used with a molar ratio, as compared to B-functionalized polymers M ([C]/[B]), comprised between 1 and 20, and preferably between 1 and 10.

Boronic Ester Function

A boronic ester function may be formed by reacting a boronic acid with an alcohol, a 1,2- or 1,3-diol, or a polyol in any kind of solvents or media that does not contain reactive groups capable of forming a boronic ester.

A boronic ester function may also be formed by reacting a boronic ester with an alcohol, a 1,2- or 1,3-diol, or a polyol in any kind of solvents or media that does not contain reactive groups capable of forming a boronic ester.

A boronic ester function may as well be formed by reacting a boronic ester with a boronic acid in any kind of solvents or media that does not contain reactive groups capable of forming a boronic ester.

A boronic ester function may further be formed by reacting a boronic ester with another boronic ester in any kind of solvents or media that does not contain reactive groups capable of forming a boronic ester (see Boronic Acids: Preparation And Applications In Organic Synthesis And Medicine; D. G. Hall, Editeur: Wiley-VCH Verlag GmbH (Nov. 18, 2005), ISBN-10: 3527309918, ISBN-13: 978-3527309917; P. T. Corbett et al. Dynamic Combinatorial Chemistry, Chem. Rev. 2006, 106, 3652-3711).

The reactions of formation of boronic esters may be carried out at temperatures comprised between 0 and 100° C., and preferably between 10 and 40° C.

Therefore, in a preferred embodiment of the invention, one of functional groups A and B comprises an alcohol, a 1,2- or 1,3-diol, a polyol or a boronic ester, and the other comprises a boronic acid or a boronic ester function so that the resulting -A---B- reversible covalent bond is a boronic ester. Molar ratios between A functional groups and B functional groups ([A]/[B]) can be comprised 0.01 and 10, and preferably between 0.1 and 1.

The boronic ester function may be broken by hydrolysis for pH comprised between 3 and 10 and at temperatures comprised between 0 and 100° C., and preferably between 10 and 40° C. The stability of boronic ester toward hydrolysis can be adjusted at will by changing the substituent on boronic acid and the structure and functionality of the alcohol, diol, polyol. In non aqueous media, the acid may be used in catalytic amount, with a molar ratio, as compared to B-functionalized polymers M, comprised between 0.001 and 1, and preferably between 0.01 and 0.1. Water can be used with a molar ratio, compared to B-functionalized polymers M, comprised between 1 and 20, and preferably between 1 and 10. The hydrolysis may be carried at temperatures comprised between 0 and 100° C., and preferably between 10 and 40° C.

The boronic ester function may also be broken by reaction with a competitor molecule C at temperatures comprised between 0 and 100° C., and preferably between 10 and 40° C. Competitor molecules may be small organic molecules or polymers carrying at least one of the following functional groups: alcohol, 1,2- or 1,3-diol, boronic acid or boronic ester. Polyols can also be used to break the boronic ester function (Boronic Acids: Preparation And Applications In Organic Synthesis And Medicine; D. G. Hall, Editeur: Wiley-VCH Verlag GmbH (Nov. 18, 2005), ISBN-10: 3527309918, ISBN-13: 978-3527309917; Boronic Acids in Molecular Self-Assembly, N. Fujita et al. Chem. Asian J. 2008, 3, 1076-1091; P. T. Corbett et al. Dynamic Combinatorial Chemistry, Chem. Rev. 2006, 106, 3652-3711). The competitor C can be used with a molar ratio, as compared to B-functionalized polymers M ([C]/[B]), comprised between 1 and 20, and preferably between 1 and 10.

Acetal Function

An acetal function may be formed by reacting an alcohol, a 1,2- or 1,3-diol, or a polyol with an aldehyde or a ketone in any kind of solvents or media that does not contain reactive groups capable of forming acetal functions.

An acetal function may also be formed by reacting an alcohol, a 1,2- or 1,3-diol, or a polyol with an acetal in any kind of solvents or media that does not contain reactive groups capable of forming acetal functions.

An acetal function may as well be formed by reacting an acetal with another acetal in any kind of solvents or media that does not contain reactive groups capable of forming acetal functions.

An acetal function may further be formed by reacting an aldehyde or a ketone with an acetal in any kind of solvents or media that does not contain reactive groups capable of forming acetal functions (T. W. Greene, P. G. M. Wuts, Protective Groups in Organic Synthesis, Third edition, 1999, ISBN 0-471-160-19-9; P. T. Corbett et al. Dynamic Combinatorial Chemistry, Chem. Rev. 2006, 106, 3652-3711).

The acetal function may be formed at temperatures comprised between 0 and 100° C., and preferably between 10 and 40° C.

Therefore, in a preferred embodiment of the invention, one of functional groups A and B comprises an alcohol function, a 1,2- or 1,3-diol, a polyol or an acetal and the other comprises an aldehyde, a ketone or an acetal function so that the resulting -A---B- reversible covalent bond is an acetal function.

Molar ratios between A functional groups and B functional groups ([A]/[B]) may be comprised between 0.01 and 10, and preferably between 0.1 and 1.

The acetal function may be broken by acid hydrolysis at temperatures comprised between 0 and 100° C., and preferably between 10 and 40° C. (T. W. Greene, P. G. M. Wuts, Protective Groups in Organic Synthesis, Third edition, 1999, ISBN 0-471-160-19-9). Inorganic acids as well as organic acids may be used for acetal hydrolysis. Inorganic acids that can be used include, but are not limited to, HCl, H2SO4. Organic acids that can be used include, but are not limited to, pyridinium 4-toluenesulfonate, p-toluenesulfonic acid, triflic acid, carboxylic acids. The acid may be used in catalytic amount, with a molar ratio, as compared to B-functionalized polymers M, comprised between 0.001 and 1, and preferably between 0.01 and 0.1. Water can be used with a molar ratio, as compared to B-functionalized polymers M, comprised between 1 and 20, and preferably between 1 and 10.

The acetal function may also be broken by reaction with a competitor molecule C at temperatures comprised between 0 and 100° C., and preferably between 10 and 40° C. Competitor molecules may be small organic molecules or polymers carrying at least of the following functional groups: an alcohol function, a 1,2- or 1,3-diol, a polyol, an aldehyde, a ketone or an acetal function (T. W. Greene, P. G. M. Wuts, Protective Groups in Organic Synthesis, Third edition, 1999, ISBN 0-471-160-19-9; P. T. Corbett et al. Dynamic Combinatorial Chemistry, Chem. Rev. 2006, 106, 3652-3711). The competitor C can be used with a molar ratio, as compared to B-functionalized polymers M ([C]/[B]), comprised between 1 and 20, and preferably between 1 and 10.

Dispersion

The present invention is also directed to a dispersion of solid particles P in a medium, wherein the solid particles P are attached to at least one polymer M through one or several reversible covalent bonds -A---B-, wherein A and B are functional groups respectively grafted to P and M thus forming a particle-containing entity P-(A---B-M)$_x$ with x being greater than or equal to 1, M is a stabilizing agent capable of dispersing the particle P in a medium and has a degree of polymerization comprised between 5 and 1000, preferably ranging from 5 to 500, and wherein the reversible covalent bond -A---B- is chosen among an imine, a disulfide, a boronic ester or an acetal function.

In a preferred embodiment, in the dispersions of the present invention, the A-functionalized particles are present in an amount of less or equal to 25% by weight of the dispersion and B-functionalized polymers M are present in an amount of less or equal to 50% by weight of the dispersion.

In a preferred embodiment, the polymers M are soluble or solubilized in the medium and induce steric or electrostatic repulsion between the particles in the medium.

The solid particles P used in the dispersions of the invention can be of any kind as previously indicated, but can preferably be chosen among metal, metal oxide, silica, cellulose particles, carbon nanotubes (CNTs), graphene sheets, or pigments, such as TiO2, Cr2O3, Fe2O3, Fe3O4 anthraquinones, phthalocyanines, perylene, quinacridone, indigoid, conductive or magnetic particles, or particles that may be used as catalysts.

The polymers used in the dispersions of the invention can be of any kind as previously indicated and for example chosen among organic, inorganic, hydrophilic, hydrophobic, neutral or ionic. Polymer M may be linear, branched, hyperbranched, grafted, comb-like, star-like, cyclic or a combination of these topologies. Polymer M may also be a homopolymer, a block copolymer, a random copolymer, a gradient copolymer, an alternating copolymer or a multi-block copolymer.

The dispersion or aggregation of the particle-containing entity P-(A---B-M)$_x$ within the dispersing phase may be also controlled by adjusting the temperature of the medium, for instance when reaching the θ-temperature. If a solvent is precisely poor enough to cancel the effects of excluded volume expansion, the theta (θ) conditions are satisfied. For a given polymer-solvent pair, the theta conditions are satisfied at a certain temperature, called the theta (θ) temperature. For polymer-solvent systems exhibiting an upper critical solution temperature, polymer chains are soluble in the given solvent above the theta temperature and precipitate below the theta temperature. For polymer-solvent pairs exhibiting a lower critical solution temperature, polymer chains are soluble in the given solvent below the theta temperature and precipitate above the theta temperature. In that case, the polymer M which stabilizes the dispersion by steric or electrostatic repulsions can swell or collapse either by heating or cooling the dispersion. Compilations of theta temperatures and theta solvents are available in the literature. (Polymer Handbook, 4th Edition; J. Brandrup, E. H. Immergut, E. A. Grulke; Wiley-Interscience; 4 edition (Feb. 22, 1999); ISBN-10: 0471166286; ISBN-13: 978-0471166283).

When the polymer M is a stimuli responsive polymer, the dispersion or aggregation of the particle-containing entity P-(A---B-M)$_x$ within the dispersing phase may be also controlled by applying an appropriate physicochemical stimulus to the medium, such as varying the temperature, the pH, or the ionic strength, or subjecting the medium to light, depending on the type of stimuli responsive polymer.

One advantage of the present invention is that once the particle-containing entity P-(A---B-M)$_x$ are dispersed in the medium, they may be then aggregated by decreasing the solubility of the polymers M into the medium. As described above, it can be done either by heating or cooling the dispersion when the pair solvent/polymer M exhibits an upper critical solution temperature or a lower critical solution temperature, or by applying an appropriate physicochemical stimulus to the medium when the polymer M is a stimuli responsive polymer. By the same token, the viscosity of the dispersion may be increased or decreasing as desired.

After aggregation, the particle-containing entity P-(A---B-M)$_x$ may be recovered by physical separation, such as filtration or centrifugation.

After recovery, the particle-containing entity P-(A---B-M)$_x$ may be then re-dispersed in the same or a different medium.

In another embodiment, the dispersion or aggregation of the particle-containing entity P-(A---B-M)$_x$ within the dispersing phase may be also controlled by adjusting a magnetic or electrical field. For instance, magnetic particles P, such as magnetites or ferrites, can be aggregated by applying a magnetic field and re-dispersed when the field is cut off. In the same way, conductive particles, such as carbon nanotubes can be dispersed by applying an electrical field and aggregated when the field is cut off.

In another embodiment, after recovery, the particle-containing entity P-(A---B-M)$_x$ may be subjected to a treatment in order to break the reversible covalent bond between the B-functionalized polymers M and the A-functionalized the particles P. It can be done by techniques well known by the person skilled in the art (as described above). For instance, the breaking of the reversible covalent can be done by increasing or decreasing the pH of the medium, by using adding a reducing agent to the medium, or by adding a competitive agent C.

The Medium or Dispersing Phase

The medium or dispersing phase may be any kind of liquid medium in which particles can be dispersed.

In one embodiment, the medium can be a solvent, for instance a polar, apolar, protic, non protic, ionic or non ionic solvent. It can be a mixture of various solvents.

In another embodiment, the medium can be a polymer melt devoid of solvent.

In another embodiment, the medium can be a reactive solvent composed of monomers, polymerizable oligomers, multifunctional monomers and radical initiators. The radical initiators may be photo-initiatiors or thermal initiators.

Methods

One object of the present invention is a method for preparing the particle-containing entity P-(A---B-M)$_x$ as previously disclosed, said method comprising the following steps:

attaching the functional group A to the surface of the solid particle P, thereby forming A-functionalized particles P or providing said A-functionalized particles P, attaching the functional group B to a polymer M, thereby forming B-functionalized polymers M or providing said B-functionalized polymers M, and wherein the functional group B is able to form a reversible covalent bond with the functional group A, reacting the A-functionalized particles P with at least one B-functionalized polymer M to form a reversible covalent bond between the functional groups A and B, thereby forming the P-(A---B-M)$_x$ particle-containing entity with x being greater than or equal to 1.

Another object of the present invention is a method for sequentially forming and breaking the reversible covalent bonds -A---B- in particle-containing entity P-(A---B-M)$_x$ as previously disclosed, said method comprising the following steps:

attaching the functional group A to the surface of the solid particle P, thereby forming A-functionalized particles P or providing said A-functionalized particles P, attaching the functional group B to a polymer M, thereby forming B-functionalized polymers M or providing said B-functionalized polymers M, and wherein the functional group B is able to form a reversible covalent bond with the functional group A, reacting the A-functionalized particles P with at least one B-functionalized polymer M to form a reversible covalent bond between the functional groups A and B, thereby forming the P-(A---B-M)x particle-containing entity with x being greater than or equal to 1, breaking the covalent bonds -A---B- that link the A-functionalized particles and the B-functionalized particles.

This method can further comprise a step of recovering particles P after the breaking of the covalent bond(s) -A---B- by physical separation, such as filtration or centrifugation.

Another object of the present invention is a method for preparing the dispersion of the invention, said method comprising the following steps:

attaching the functional groups A to the surface of the solid particles P, thereby forming A-functionalized particles P or providing said A-functionalized particles P, attaching the functional group B to a polymer M, thereby forming B-functionalized polymers M or providing said B-functionalized polymers M, and wherein the functional group B is able to form a reversible covalent bond with the functional group A, reacting, via a reversible reaction, the A-functionalized particles P with at least one B-functionalized polymer M to form a reversible covalent bond between the functional groups A and B, thereby forming the P-(A---B-M)$_x$ particle-containing entity with x being greater than or equal to 1, dispersing the P-(A---B-M)$_x$ particle-containing entity in the medium.

In a preferred embodiment, the B-functionalized polymers M are soluble or solubilized in the medium and induce steric or electrostatic repulsion between the particles P in the medium.

In a preferred embodiment, the polymers M and the melt chains of the polymer melt in which particles-containing entity P-(A---B-M)$_x$ are dispersed present a negative Flory interaction parameter $\chi$.

As mentioned previously, a large number of solid particles P having functional groups A able to form reversible covalent bonds attached to their surface are commercially available. Similarly, a large number of polymers M provided with functional groups B able to form reversible covalent bonds are commercially available. A-functionalized particles P or B-functionalized polymers M may also be prepared according to techniques well-known by the person skilled in the art.

The step of reacting said A-functionalized particles P with said B-functionalized polymers M in the medium to form reversible covalent bonds -A---B- may be carried out according to the conditions described in the state of the art (as described previously).

The dispersing step may be carried out mechanically or by using a mechanochemical method, such as ultrasonication, ball-milling, or grinding.

Another object of the present invention is a method for sequentially dispersing and aggregating nanoparticles in a solvent, said method comprising the following steps:

preparing a dispersion of A-functionalized solid particles P in a medium as previously disclosed, thereby forming the particle-containing entity P-(A---B-M)$_x$ dispersed in said medium wherein the B-functionalized polymers M are reversibly attached to the A-functionalized particles P through one or several reversible covalent bonds, aggregating the particles P by either reducing the solubility of the polymers M in the medium and/or by breaking the reversible covalent bond(s) -A---B-.

As mentioned previously, the aggregation of the particles P may, in one embodiment, be operated by decreasing the solubility of the polymers M in the dispersing medium, thereby reducing the steric or electrostatic repulsion between polymers M in the medium. This can be done by heating or cooling the dispersion when the pair medium/polymers M exhibits an upper critical solution temperature or a lower critical solution temperature, as described above. When the polymer M is a stimuli responsive polymer, it may be done by applying the appropriate physicochemical stimuli, as described above. For instance, it may be done by varying the temperature, the pH or the ionic strength of the dispersion, or by subjecting the dispersion to light. When particles are magnetic or conductive particles, it may be done by applying an external magnetic or electrical field, as described previously.

In a preferred embodiment, reducing the solubility of the polymers M in the medium may be carried out by a modification of the temperature of the medium, thereby recovering the particle-containing entity P-(A---B-M)$_x$.

When the aggregation of the particles P is operated by decreasing the solubility of the polymer M in the dispersing medium, the method of the invention may further comprise a step of recovering the particle-containing entity P-(A---B-M)$_x$ after the step of aggregation by physical separation, such as filtration or centrifugation.

The method may further comprise a step of breaking the reversible covalent bond -A---B- when the particles recovered are in the form of the particle-containing entity P-(A---B-M)$_x$, thereby recovering A-functionalized particles.

In another embodiment, the aggregation of the particles P in the medium may also be operated by breaking the reversible covalent bond(s) -A---B-. The breaking of this covalent bond may be done in the appropriate conditions as described in the state of the art, depending on the type of reversible covalent bond (as described previously). For instance, it may be carried out by a modification of the pH or by addition of a competitor molecule C in the medium. Competitor molecules may be small organic molecules or polymers carrying at least one functional group capable of breaking the reversible covalent bond -A---B-, as described above.

In this embodiment, the method of the invention may further comprise a step of recovering the A-functionalized particles P by physical separation, such as filtration or centrifugation.

After recovery, the A-functionalized particles P may be then re-dispersed in the same or in a different medium by attaching at least one B-functionalized polymer M to the A-functionalized particles P through one or several reversible covalent bonds -A---B-, wherein A and B are functional groups respectively grafted to P and M thus forming a particle-containing entity P-(A---B-M)$_x$ with x being greater than or equal to 1.

Such dispersion/aggregation/recovery/redispersion cycle can be achieved multiple times thanks to the reversible nature of the reversible covalent bonds that link the A-functionalized particles P and the B-functionalized polymers M in the entity P-(A---B-M)$_x$.

Applications

One object of the invention is also a composition comprising the particle-containing entity P-(A---B-M)$_x$ previously disclosed or the dispersion of the invention. In particular, the composition can be a liquid composition such as an ink, painting, colorant, a polymer melt or a reactive medium that can be polymerized as described above.

The solid particle P attached to at least one polymer M through one or several reversible covalent bonds -A---B- of the invention may be also used as a catalyst in a reaction medium.

The particles of catalyst may be easily recovered from the reaction medium by aggregating the particles as described above, and then recovered by physical separation from the reaction medium.

EXAMPLES

Preparation of Dispersions of A-functionalized Particles in Media Containing B-functionalized Polymers

Examples 1-31

The purpose of these examples is to illustrate the dispersability of A-functionalized particles in solutions containing B-functionalized polymers as compared to pure solvent solutions. These examples illustrate dispersions obtained by the present invention.

For examples 1-31, a two step reaction sequence was followed, as shown in equation 1. In the first step, chemical groups A were attached to the surface of particles P, thereby forming the A-functionalized particles P (examples 1-2). In a subsequent step, the A-functionalized particles P were dispersed in a medium S containing B-functionalized polymers M. Particles were dispersed in the medium as the P-(A---B-M)$_x$ entity (examples 3-10 and 17-24). The scheme below is meant to be illustrative but not limiting. In contrast, and to illustrate particles dispersion of the present invention, A-functionalized particles P we dispersed in a pure medium S (examples 10-16 and 25-31).

Equation 1

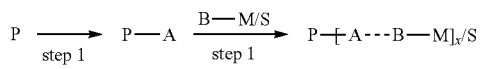

Examples are given below for P=multiwall carbon nanotubes (MWCNT) and Stöber silica (SiO$_2$), A=benzaldehyde (ald), B=primary amine (NH$_2$), M=polystyrene (PS), poly(propylene oxide-ethylene oxide) (PPO/PEO), and poly(ethylene glycol) (PEG), and S=cyclohexane, toluene, chloroform, acetonitrile, N,N-dimethyformamide (DMF), ethyl alcohol, and water.

Preparation of Benzaldehyde-functionalized Particles (P=MWCNT and SiO$_2$, A=benzaldehyde)

Examples 1-2

The following general procedure was followed for preparing benzaldehyde-functionalized particles.

Particles P (5 mmol) were dispersed in 50 mL of water by ultrasonication (1 h) then isoamyl nitrite (10 mmol) and 3-aminobenzaldehyde ethylene acetal (10 mmol) were added to the mixture. The reacting media was then heated to 80° C. under vigorous agitation for 24 h. The resultant mixture was cooled down to room temperature and most of the water was then evaporated under vacuum. 50 mL of DMF were added and the benzaldehyde-functionalized particles were filtered on a PTFE membrane and washed until the filtrate became clear. The resulting powder was dried under vacuum overnight.

| examples | particle | Molar ratio (P:isomaylnitrite:A) | Work up |
|---|---|---|---|
| 1 | MWCNT, Graphistrength C100 (Arkema) | 1:2:2 | water, 80° C. |
| 2 | Stöber silica | 1:2:2 | water, 80° C. |

Preparation of Dispersions of Benzaldehyde-functionalized MWCNT in Different Solvents S Containing Amino-functionalized Polymers (P=MWCNT, A=Benzaldehyde, B=NH$_2$, M=PS, PPO/PEO, S=Cyclohexane, Toluene, Chloroform, Acetonitrile, DMF, Ethyl Alcohol, Water)

Examples 3-16

The purpose of these examples is to illustrate the dispersability of benzaldehyde-functionalized MWCNT in solutions of amino-functionalized polymers as compared to pure solvent solutions.

The following general procedure was followed for preparing dispersions of benzaldehyde-functionalized MWCNT (MWCNT-ald).

0.05 wt. % MWCNT-ald were dispersed by ultrasonication (150 W, 30 min) in 0.05-0.15 wt. % NH$_2$-polymer M solutions (examples 3-9) or in pure solvents (examples 10-16). Dispersions were allowed to stand 24 hours and observed using a Leica Leitz DM RD light microscope containing a calibrated ocular lens (10×/0.30 PH1). Absence of aggregates bigger than 10 μm indicates a stable dispersion of MWCNT-ald. Results are set in table 1.

TABLE 1

| examples | MWCNT-ald (g) | NH$_2$—M (g) | medium S (g) | aggregates > 10 μm |
|---|---|---|---|---|
| 3 | 0.005 | 0.012 PS—NH$_2$ | 9.983 cyclohexane | none |
| 4 | 0.005 | 0.012 PS—NH$_2$ | 9.983 toluene | none |
| 5 | 0.005 | 0.012 PS—NH$_2$ | 9.983 chloroform | none |
| 6 | 0.005 | 0.007 PPO/PEO-NH$_2$ | 9.983 acetonitrile | none |
| 7 | 0.005 | 0.007 PPO/PEO-NH$_2$ | 9.983 DMF | none |
| 8 | 0.005 | 0.007 PPO/PEO-NH$_2$ | 9.983 ethyl alcohol | none |
| 9 | 0.005 | 0.007 PPO/PEO-NH$_2$ | 9.983 water | none |
| 10 | 0.005 | | 9.995 cyclohexane | yes |
| 11 | 0.005 | | 9.995 toluene | yes |
| 12 | 0.005 | | 9.995 chloroform | yes |
| 13 | 0.005 | | 9.995 acetonitrile | none |
| 14 | 0.005 | | 9.995 DMF | none |
| 15 | 0.005 | | 9.995 ethyl alcohol | yes |
| 16 | 0.005 | | 9.995 water | yes |

These examples show that stable, conventional dispersions can be prepared with benzaldehyde-functionalized MWCNT and amino-functionalized polymers M in a good solvent of the amino-functionalized polymers M, thanks to the imine reversible covalent bond that is formed by reaction between benzaldehyde and amine functions.

Benzaldehyde-functionalized MWCNT aggregate in absence of amino-functionalized polymers M, except in DMF and acetonitrile, which are both polar aprotic solvents that can solubilize the benzaldehyde functions attached onto MWCNT.

Preparation of Dispersions of
Benzaldehyde-functionalized Silica Particles in
Different Solvents S Containing
Amino-functionalized Polymers M (P=$SiO_2$,
A=Benzaldehyde, B=$NH_2$, M=PS, PPO/PEO,
PEG, S=Cyclohexane, Toluene, Chloroform,
Acetonitrile, DMF, Ethyl Alcohol, Water)

Examples 17-31

The purpose of these examples is to illustrate the dispersability of benzaldehyde-functionalized silica particles in solution of amino-functionalized polymers M as compared to pure solvent solutions.

The following general procedure was followed for preparing stable dispersions of benzaldehyde-functionalized silica particles ($SiO_2$-ald).

0.05 wt. % $SiO_2$-ald were dispersed by ultrasonication (150 W, 30 min) in 0.05-0.15 wt. % $NH_2$-polymer M solutions (examples 17-24) or in pure solvents (examples 25-31). Dispersions were allowed to stand 24 hours and observed using a Leica Leitz DM RD light microscope containing a calibrated ocular lens (10×/0.30 PH1). Absence of aggregates bigger than 10 μm indicates a stable dispersion of $SiO_2$-ald. Results are set in table 2.

TABLE 2

| examples | $SiO_2$-ald (g) | $NH_2$—M (g) | medium S (g) | aggregates > 10 μm |
|---|---|---|---|---|
| 17 | 0.005 | 0.01 PPO/PEO-$NH_2$ | 9.985 cyclohexane | none |
| 18 | 0.005 | 0.01 PS—$NH_2$ | 9.985 toluene | none |
| 19 | 0.005 | 0.012 PS—$NH_2$ | 9.985 chloroform | none |
| 20 | 0.005 | 0.01 PPO/PEO-$NH_2$ | 9.985 acetonitrile | none |
| 21 | 0.005 | 0.01 PPO/PEO-$NH_2$ | 9.985 DMF | none |
| 22 | 0.005 | 0.01 PPO/PEO-$NH_2$ | 9.985 ethyl alcohol | none |
| 23 | 0.005 | 0.01 PPO/PEO-$NH_2$ | 9.985 water | none |
| 24 | 0.005 | 0.01 PEG-$NH_2$ | 9.985 water | none |
| 25 | 0.005 | | 9.995 cyclohexane | yes |
| 26 | 0.005 | | 9.995 toluene | some |
| 27 | 0.005 | | 9.995 chloroform | some |
| 28 | 0.005 | | 9.995 acetonitrile | none |
| 29 | 0.005 | | 9.995 DMF | none |
| 30 | 0.005 | | 9.995 ethyl alcohol | some |
| 31 | 0.005 | | 9.995 water | yes |

These examples show that stable, conventional dispersions can be prepared with benzaldehyde-functionalized silica particles and amino-functionalized polymers M in a good solvent of the amino-functionalized polymer, thanks to the imine reversible covalent bond that is formed by reaction between benzaldehyde and amine functions. Benzaldehyde-functionalized silica particles form big aggregates in absence of amino-functionalized polymers M in cyclohexane and water, which are apolar aprotic and polar protic solvent, respectively, that cannot solubilize the benzaldehyde functions attached onto silica particles. Some small aggregates (around 10 μm) of benzaldehyde-functionalized silica particles are observed in toluene, chloroform and ethyl alcohol.

Aggregation of A-functionalized Particles in Media
Containing B-functionalized Polymers by Breaking
the Reversible Covalent Bonds -A---B- that Link
the A-functionalized Particles P and the
B-functionalized Polymers M and Subsequent
Re-dispersions Examples 32-42

The purpose of these examples is to illustrate the controlled aggregation of A-functionalized particles in solutions of B-functionalized polymers M by breaking the reversible covalent bonds -A---B- that link the A-functionalized particles P and the B-functionalized polymers M. These examples also illustrate the particles recycling and re-dispersion as described in examples 3-9 and 17-24.

The following general procedure was followed for aggregating benzaldehyde-functionalized particles. The procedure is meant to be illustrative but not limiting. 1 to 3 droplets of mineral or organic acid X were added to a stable dispersion described previously. Aggregation took place within 10 to 30 minutes. Benzaldehyde-functionalized particles were separated from the B-functionalized polymer solutions by centrifugation.

The benzaldehyde-functionalized particles hence recovered could then be re-dispersed in another B-functionalized polymer solution according the procedure described in examples 3-9 and 17-24. Aggregations were macroscopically observed and dispersions were observed using a Leica Leitz DM RD light microscope containing a calibrated ocular lens (10×/0.30 PH1). Absence of aggregates bigger than 10 μm indicates a stable dispersion of benzaldehyde-functionalized particles. All aggregation/re-dispersion procedures were repeated at least twice.

Aggregation of Benzaldehyde-functionalized
MWCNT in Toluene Containing
Amino-functionalized Polymers (P=MWCNT,
A=Benzaldehyde, B=$NH_2$, M=PS, PPO/PEO,
S=Toluene) and Re-dispersion in Aqueous Solution
Containing Amino-functionalized Polymers Examples 32-35

These examples illustrate the controlled aggregation of benzaldehyde-functionalized MWCNT in solutions of amino-functionalized polymers by breaking the reversible covalent bonds -A---B- that link the A-functionalized particles P and the B-functionalized polymers M. They also illustrate the particles recycling and re-dispersion as described in examples 3-9.

The following general procedure was followed for aggregating benzaldehyde-functionalized MWCNT. 2 droplets of mineral or organic acid X were added to a stable dispersion of MWCNT-ald in toluene. Aggregation took place within 10 to 30 minutes. Benzaldehyde-functionalized MWCNT were separated from the amino-functionalized polymer solution by centrifugation. The benzaldehyde-functionalized MWCNT hence recovered could then be re-dispersed in another amino-functionalized polymer solution according the procedure described in examples 3-9. Dispersions were observed using a Leica Leitz DM RD light microscope containing a calibrated ocular lens (10×/0.30 PH1). Absence of aggregates bigger than 10 μm indicates a stable dispersion of benzaldehyde-functionalized MWCNT). Aggregations were macroscopically observed. All aggregation/re-dispersion procedures were repeated at least twice. Results are set in table 3.

TABLE 3

| examples | Dispersion NH$_2$—M/S | number of droplets, X acid | aggregation | total aggregation time (min) | re-dispersion NH$_2$—M/S | aggregates > 10 μm |
|---|---|---|---|---|---|---|
| 32 | 0.07 wt % NH$_2$—PPO/PEO toluene | 2 HCl 37% | yes | 20 | 0.07 wt % NH$_2$—PEG water | none |
| 33 | 0.07 wt % NH$_2$—PPO/PEO toluene | 2 PTSA | yes | 20 | | |
| 34 | 0.07 wt % NH$_2$—PS toluene | 2 HCl 37% | yes | 20 | 0.07 wt % NH$_2$—PPO/PEO water | none |
| 35 | 0.07 wt % NH$_2$—PS toluene | 2 PTSA | yes | 20 | | |

PTSA: para-toluenesulfonic acid

These examples show that stable dispersions of benzaldehyde-functionalized multiwall carbon nanotubes in solution of amino-functionalized polymer can be aggregated by breaking the imine reversible covalent bonds -A---B- that link the A-functionalized particles P and the B-functionalized polymers M, by acid hydrolysis. Benzaldehyde-functionalized MWCNT can be recovered and re-dispersed in others solvents in the presence of soluble amino-functionalized polymers M.

Aggregation of Benzaldehyde-functionalized Silica Particles in Solvent S Containing Amino-functionalized Polymer and Re-dispersion in Solution of Amino-functionalized Polymers M(P=SiO$_2$, A=Benzaldehyde, B=NH$_2$, M=PS, PPO/PEO, PEG, S=Cyclohexane, Toluene, Water)

Examples 36-42

These examples illustrate the controlled aggregation of benzaldehyde-functionalized silica particles in solutions of amino-functionalized polymers M by breaking the reversible covalent bonds -A---B- that link the A-functionalized particles P and the B-functionalized polymers M-. They also illustrate particles recycling and re-dispersion as described in examples 17-24.

The following general procedure was followed for aggregating benzaldehyde-functionalized silica particles. 1 to 3 droplets of HCl 37% were added to a stable dispersion described previously. Aggregation took place within 1 to 30 minutes. Benzaldehyde-functionalized silica particles were separated from the amino-functionalized polymer solutions by centrifugation. The benzaldehyde-functionalized silica particles hence recovered could then be re-dispersed in another amino-functionalized polymer solution according to the procedure described in examples 17-24. Dispersions were observed using a Leica Leitz DM RD light microscope containing a calibrated ocular lens (10×/0.30 PH1). Absence of aggregates bigger than 10 μm indicates a stable dispersion of benzaldehyde-functionalized silica particles. Aggregations were macroscopically observed. All aggregation/re-dispersion procedures were repeated at least twice. Results are set in table 4.

TABLE 4

| examples | Dispersion NH$_2$—M/S | number of droplets HCl 37% | aggregation | total aggregation time (min) | re-dispersion NH$_2$—M/S | aggregates > 10 μm |
|---|---|---|---|---|---|---|
| 36 | 0.1 wt % NH$_2$—PPO/PEO cyclohexane | 3 | yes | 20 | 0.1 wt % NH$_2$—PEG water | none |
| 37 | 0.1 wt % NH$_2$—PEG water | 3 | yes | 20 | 0.1 wt % NH$_2$—PS toluene | none |
| 38 | 0.1 wt % NH$_2$—PEG water | 2 | yes | 30 | | |
| 39 | 0.1 wt % NH$_2$—PEG water | 1 | yes | 30 | | |
| 40 | 0.1 wt % NH$_2$—PPO/PEO water | 3 | yes | 20 | | |
| 41 | 0.1 wt % NH$_2$—PPO/PEO water | 2 | yes | 30 | | |

TABLE 4-continued

| examples | Dispersion NH$_2$—M/S | number of droplets HCl 37% | aggregation | total aggregation time (min) | re-dispersion NH$_2$—M/S | aggregates > 10 μm |
|---|---|---|---|---|---|---|
| 42 | 0.1 wt % NH$_2$—PPO/PEO water | 1 | yes | 30 | | |

These examples show that stable dispersions of benzaldehyde-functionalized silica particles in solution of amino-functionalized polymers M can be aggregated by breaking the imine reversible covalent bonds -A---B- that link the A-functionalized particles P and the B-functionalized polymers M, by acid hydrolysis. Benzaldehyde-functionalized silica particles can be recovered and re-dispersed in others solvents in the presence of soluble amino-functionalized polymers M. These examples also illustrate that aggregation time is correlated to acid quantity, and that acid can be added in catalytic amount to trigger imine function breaking and thereby aggregation of benzaldehyde-functionalized silica particles.

Temperature Controlled Aggregation and Re-dispersions of A-functionalized Particles in Solvent S Containing B-functionalized Polymers M in Theta-conditions (P=MWCNT, SiO$_2$, A=Benzaldehyde, B=NH$_2$, M=PS, PPO/PEO, S=Cyclohexane, Water)

Examples 43-46

The purpose of these examples is to illustrate the controlled aggregation/dispersion process of A-functionalized particles in a solution of B-functionalized polymers by changing the temperature, when solvent/polymer M couple exhibits an upper critical solution temperature or a lower critical solution temperature.

The following general procedure was followed for aggregating benzaldehyde-functionalized particles. The procedure is meant to be illustrative but not limiting.

A stable dispersion at a temperature T1 was heated or cooled to a temperature T2. Aggregation was macroscopically observed. The non-homogeneous solution was then cooled or heated to temperature T1, under stirring or ultrasonication. Re-dispersion was observed using Leica Leitz DM RD light microscope containing a calibrated ocular lens (10×/0.30 PH1). Absence of aggregates bigger than 10 μm indicates a stable dispersion of P-(A---B-M)$_x$ entities. All aggregation/re-dispersion procedures were repeated at least twice.

Temperature Controlled Aggregation and Re-dispersions of Benzaldehyde-functionalized Particles in Cyclohexane Containing Amino-functionalized Polystyrene (P=MWCNT, SiO$_2$, A=Benzaldehyde, B=NH$_2$)

Examples 43-44

The couple cyclohohexane/polystyrene exhibits an upper critical solution temperature. This means that there is a temperature theta at which polystyrene is no longer soluble (theta=31-33° C.) in cyclohexane. A stable dispersion of benzaldehyde-functionalized particles in presence of amino-functionalized polystyrene in cyclohexane was heated to 50° C. When cooled to 0-5° C., aggregation occurred within 10-30 minutes. When re-heated to 50° C., re-dispersion occurred within 10-120 minutes under stirring or ultrasonication.

Aggregation was macroscopically observed and re-dispersions were also observed using a Leica Leitz DM RD light microscope containing a calibrated ocular lens (10×/0.30 PH1). Absence of aggregates bigger than 10 μm indicates a stable dispersion of P-(A---B-M)$_x$ entities. All aggregation/re-dispersion procedures were repeated at least twice.

| Ex. | dispersion NH$_2$—M/S | particle | total aggregation temperature and time (min) | aggregation | re-dispersion temperature and time (min) | aggregates > 10 μm |
|---|---|---|---|---|---|---|
| 43 | 0.1 wt % NH$_2$—PS cyclohexane | 0.05 wt % MWCNT | 5° C. 120 | yes | 50° C. 5 | none |
| 44 | 0.1 wt % NH$_2$—PS cyclohexane | 0.05 wt % SiO$_2$ | 0° C. 10 | yes | 50° C. 10 | none |

Temperature Controlled Aggregation and Re-dispersions of Benzaldehyde-functionalized Particles in Water Containing Amino-functionalized PPO/PEO (P=MWCNT, SiO$_2$, A=benzaldehyde, B=NH$_2$)

Examples 45-46

The couple water/poly(propylene oxide-ethylene oxide) (Jeffamine® M2005) exhibits a lower critical solution temperature This means that there is a temperature theta at which poly(propylene oxide-ethylene oxide) is no longer soluble (theta=18° C.). A stable dispersion of benzaldehyde-functionalized particles in presence of amino-functionalized poly(propylene oxide-ethylene oxide) in water was cooled to 0-5° C. When heated to 50° C., aggregation occurred within 10-120 minutes. When re-cooled to 0-5° C., re-dispersion occurred within 10-120 minutes under stirring or ultrasonication. Aggregations were macroscopically observed and re-dispersions were also observed using a Leica Leitz DM RD light microscope containing a calibrated ocular lens (10x/0.30 PH1). Absence of aggregates bigger than 10 μm indicates a stable dispersion of P-(A---B-M)$_x$ entities. All aggregation/re-dispersion procedures were repeated at least twice.

These examples show that stable dispersions of benzaldehyde-functionalized silica particles in solution of amino-functionalized polymer can be aggregated by breaking the imine reversible covalent bond with a competitor of either benzaldehyde, amine or imine functions. Competitor C is not a stabilizing agent in the considered medium.

| examples | dispersion NH$_2$—M/S | particle | total aggregation temperature and time (min) | aggregation | re-dispersion temperature and time (min) | aggregates > 10 μm |
|---|---|---|---|---|---|---|
| 45 | 0.1 wt % NH$_2$—PPO/PEO water | 0.05 wt % MWCNT | 50° C. 120 | yes | 5° C. 5 | none |
| 46 | 0.1 wt % NH$_2$—PPO/PEO water | 0.05 wt % SiO$_2$ | 50° C. 30 | yes | 0° C. 10 | none |

These examples show that stable dispersions of benzaldehyde-functionalized particles in solution of amino-functionalized polymers M can be aggregated and re-dispersed by changing the temperature, when solvent is a theta-solvent of the polymer. They also illustrate that temperature has no effect on the reversibility of the imine reversible covalent bond.

Aggregation of Stable Dispersion of A-functionalized Particles by Addition of a Competitor C that can Break the Reversible Covalent Bonds -A---B- that Link the A-functionalized Particles and the B-functionalized Polymers M (P=SiO$_2$, A=Benzaldehyde, B=NH$_2$, C=Benzaldehyde, NH$_2$-PEG)

Examples 47-48

The purpose of these examples is to illustrate the controlled aggregation of A-functionalized particles in solutions of B-functionalized polymers M by addition of a competitor molecule or polymer C that can break the reversible covalent bonds -A---B- of P-(A---B-M)$_x$ entities. C is able to form the same kind of reversible covalent bond as A and B, and thus compete either with A (example 47) or with B (example 48).

The following general procedure was followed for aggregating benzaldehyde-functionalized particles. The procedure is meant to be illustrative but not limiting. To a stable dispersion of 0.05 wt % benzaldehyde-functionalized silica particles was added 1-5 wt % of a competitor C which is not a stabilizing agent in the solvent. Aggregation was macroscopically observed within few seconds to 5 minutes.

| examples | dispersion NH$_2$—M/S | competitor molecule C | total aggregation time | aggregation |
|---|---|---|---|---|
| 47 | 0.1 wt % NH$_2$-PEG water | 5 wt % benzaldehyde | few seconds | yes |
| 48 | 0.1 wt % NH$_2$-PPO/PEO cyclohexane | 1 wt % NH$_2$-PEG | 5 minutes | yes |

Aggregation of Stable Dispersions of A-functionalized Particles in Theta Conditions and Re-dispersion by Addition of a Competitor C that is Soluble in the Same Conditions (P=SiO$_2$, A=Benzaldehyde, B=NH$_2$, Y=NH$_2$-PEG)

Examples 49

The following general procedure was followed for aggregating and re-dispersing benzaldehyde-functionalized particles. The procedure is meant to be illustrative but not limiting.

The couple water/poly(propylene oxide-ethylene oxide) (Jeffamine® M2005) exhibits a lower critical solution temperature This means that there is a temperature theta at which poly(propylene oxide-ethylene oxide) is no longer soluble (theta=18° C.). A stable dispersion of benzaldehyde-functionalized silica particles in presence of amino-functionalized poly(propylene oxide-ethylene oxide) in water was cooled to 0-5° C. 1 wt % of NH$_2$-PEG was added at 0° C. and the mixture was then heated to 50° C. No aggregation of silica particles was observed while the free amino functional PPO/PEO polymers collapse as a viscous liquid.

This example shows that aggregates of benzaldehyde-functionalized silica particles in a given solvent can be re-dispersed by exchanging a non stabilizing amino-functionalized polymer M with a stabilizing amino-functionalized polymer M.

The invention claimed is:
1. A method for sequentially forming and breaking a reversible covalent bond -A---B- in a particle-containing entity P-(A---B-M)$_x$ wherein P is a solid particle attached to at least one polymer M through one or several reversible covalent bonds -A---B-,
A and B are functional groups respectively grafted to P and M thus forming the P-(A---B-M)$_x$ particle-containing entity with x being greater than or equal to 1,
M has a degree of polymerization comprised between 5 and 1000 and
wherein the reversible covalent bond -A---B- is selected from the group consisting of an imine, a disulfide, a boronic ester or an acetal and wherein one of functional groups A and B comprises an amine function, a hydroxylamine function or an imine function, and the other comprises an aldehyde function, a ketone function or an imine function so that the resulting -A---B- reversible covalent bond is an imine, said method comprising the following steps:

attaching the functional group A to the surface of the solid particle P, thereby forming A-functionalized particles P or providing said A-functionalized particles P;

attaching the functional group B to a polymer M, thereby forming B-functionalized polymers M or providing said B-functionalized polymers M, and wherein the functional group B is able to form a reversible covalent bond with the functional group A;

reacting the A-functionalized particles P with at least one B-functionalized polymer M to form a reversible covalent bond between the functional groups A and B, thereby forming the P-(A---B-M)x; and, breaking the covalent bonds -A---B- that link the A-functionalized particles and the B-functionalized particles.

2. The method according to claim 1, wherein the imine covalent bond can be broken by acid hydrolysis or by reaction with a competitor molecule C carrying at least one of the following functional groups: primary amine, hydroxylamine, aldehyde, ketone or imine.

3. A method for sequentially forming and breaking a reversible covalent bond -A---B- in a particle-containing entity P-(A---B-M)$_x$ wherein P is a solid particle attached to at least one polymer M through one or several reversible covalent bonds -A---B-, A and B are functional groups respectively grafted to P and M thus forming the P-(A---B-M)$_x$ particle-containing entity with x being greater than or equal to 1, M is a linear, branched, hyperbranched, grafted, comb-like, star-like, cyclic, a homopolymer, a block copolymer, a random copolymer, a gradient copolymer, an alternating copolymer or a multiblock copolymer and has a degree of polymerization comprised between 5 and 1000 and wherein the reversible covalent bond -A---B- is selected from the group consisting of an imine, a disulfide, a boronic ester or an acetal and wherein one of functional groups A and B comprises an amine function, a hydroxylamine function or an imine function, and the other comprises an aldehyde function, a ketone function or an imine function so that the resulting -A---B- reversible covalent bond is an imine, said method comprising the following steps:

attaching the functional group A to the surface of the solid particle P, thereby forming A-functionalized particles P or providing said A-functionalized particles P;

attaching the functional group B to a polymer M, thereby forming B-functionalized polymers M or providing said B-functionalized polymers M, and wherein the functional group B is able to form a reversible covalent bond with the functional group A;

reacting the A-functionalized particles P with at least one B-functionalized polymer M to form a reversible covalent bond between the functional groups A and B, thereby forming the P-(A---B-M)x;

breaking the covalent bonds -A---B- that link the A-functionalized particles and the B-functionalized particles; and recovering the A-functionalized particles P after the breaking of the covalent bond(s) -A---B- by physical separation.

4. A method, for sequentially forming and breaking a reversible covalent bond -A---B- in a particle-containing entity P-(A---B-M)$_x$ wherein P is a solid particle attached to at least one polymer M through one or several reversible covalent bonds -A---B-, A and B are functional groups respectively grafted to P and M thus forming the P-(A---B-M)$_x$ particle-containing entity with x being greater than or equal to 1, M has a degree of polymerization comprised between 5 and 1000 and wherein the reversible covalent bond -A---B- is selected from the group consisting of an imine, a disulfide, a boronic ester or an acetal wherein the polymer M is a stabilizing agent capable of dispersing the particle P in a medium and the particles P are pigments selected from the group consisting of $TiO_2$, $Cr_2O_3$, $Fe_2O_3$, $Fe_3O_4$ anthraquinones, phthalocyanines, perylene, quinacridone or indigoid, said method comprising the following steps:

attaching the functional group A to the surface of the solid particle P, thereby forming A-functionalized particles P or providing said A-functionalized particles P;

attaching the functional group B to a polymer M, thereby forming B-functionalized polymers M or providing said B-functionalized polymers M, and wherein the functional group B is able to form a reversible covalent bond with the functional group A;

reacting the A-functionalized particles P with at least one B-functionalized polymer M to form a reversible covalent bond between the functional groups A and B, thereby forming the P-(A---B-M)x; and, breaking the covalent bonds -A---B- that link the A-functionalized particles and the B-functionalized particles.

* * * * *